United States Patent
Chang et al.

(10) Patent No.: US 8,002,539 B2
(45) Date of Patent: Aug. 23, 2011

(54) INJECTION STRETCH BLOW MOLDING SYSTEM WITH ROTATING AND LINEAR CONVEYING FUNCTIONS

(76) Inventors: Tsai-Shun Chang, Chung Ho (TW); Hsin-Chih Wu, Chung Ho (TW)

( * ) Notice: Subject to any disclaimer, the term of this patent is extended or adjusted under 35 U.S.C. 154(b) by 340 days.

(21) Appl. No.: 12/468,173

(22) Filed: May 19, 2009

(65) Prior Publication Data

US 2009/0297654 A1    Dec. 3, 2009

(30) Foreign Application Priority Data

May 29, 2008  (TW) ................................ 97209400 U

(51) Int. Cl.
   *B29C 49/06*    (2006.01)
   *B29C 49/36*    (2006.01)
(52) U.S. Cl. ......... 425/529; 425/533; 425/537; 425/540
(58) Field of Classification Search .................. 425/529, 425/533, 537, 540
   See application file for complete search history.

(56) References Cited

U.S. PATENT DOCUMENTS

| | | | | |
|---|---|---|---|---|
| 4,726,756 A | * | 2/1988 | Aoki | 425/526 |
| 4,744,742 A | * | 5/1988 | Aoki | 425/126.1 |
| 5,213,822 A | * | 5/1993 | Koga | 425/522 |
| 5,516,274 A | * | 5/1996 | Maggert | 425/526 |

* cited by examiner

*Primary Examiner* — Robert B Davis
(74) *Attorney, Agent, or Firm* — Guice Patents PLLC

(57) ABSTRACT

An injection stretch blow molding system with rotating and linear conveying functions includes a lifting and rotating mechanism, an injecting mechanism, a conveying mechanism, an extending and blowing mechanism installed at a third operating position, and a pushing mechanism installed at a second operating position. The lifting and rotating mechanism has a lifting seat, a rotating plate, and two bottleneck seats. Each of the two bottleneck seats has at least one bottleneck mold, with the rotation of the rotating plate, positions of the two bottleneck seats are selectively interchanged between a first and the second operating positions. The injecting mechanism has a female mold and a core mold installed at the first operating position. The conveying mechanism has a conveying seat connecting the two bottleneck seats whose bottleneck mold clamps a preform is installed at the second operating position. The conveying seat is driven by a convey driving device.

11 Claims, 10 Drawing Sheets

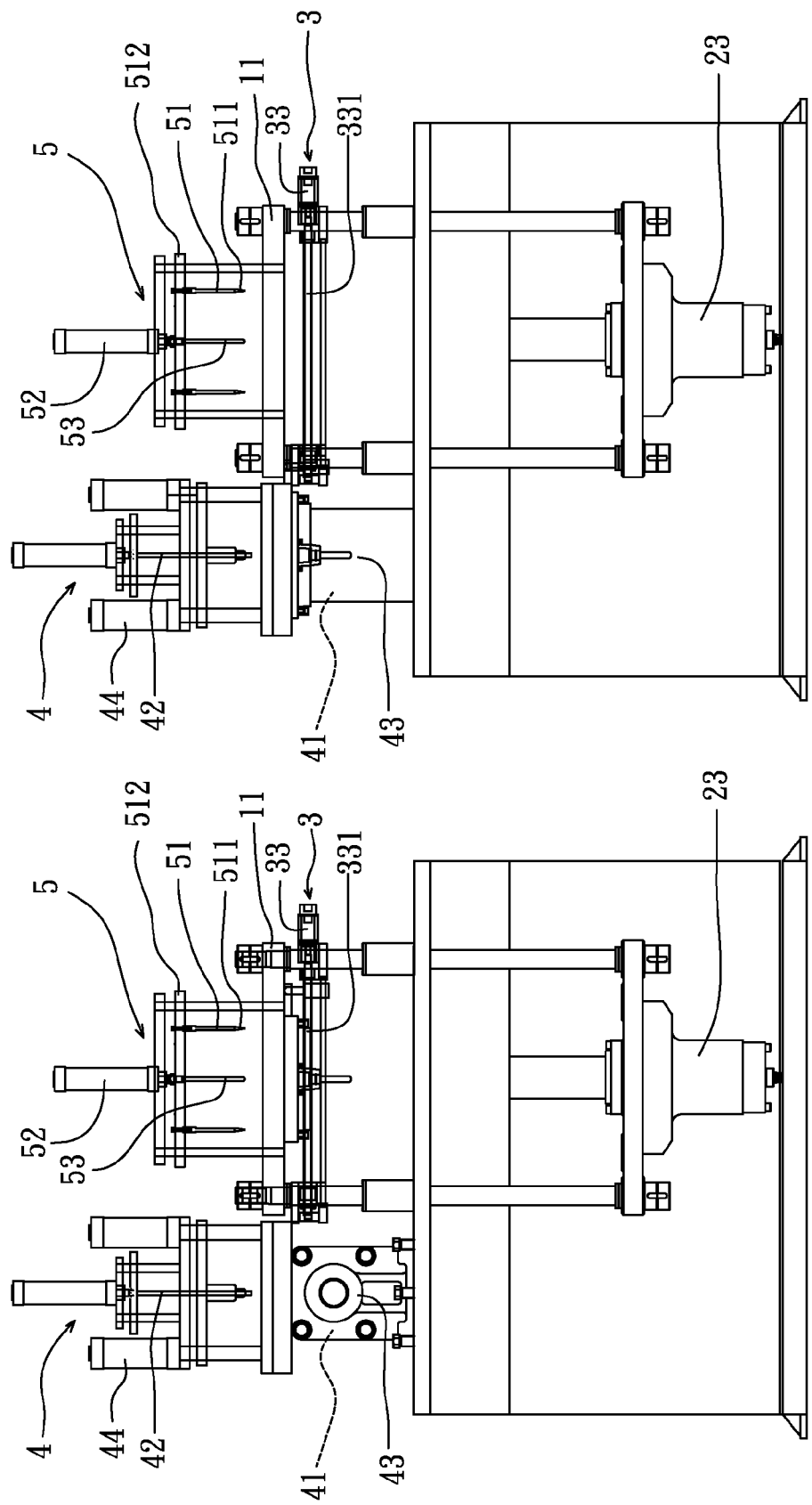

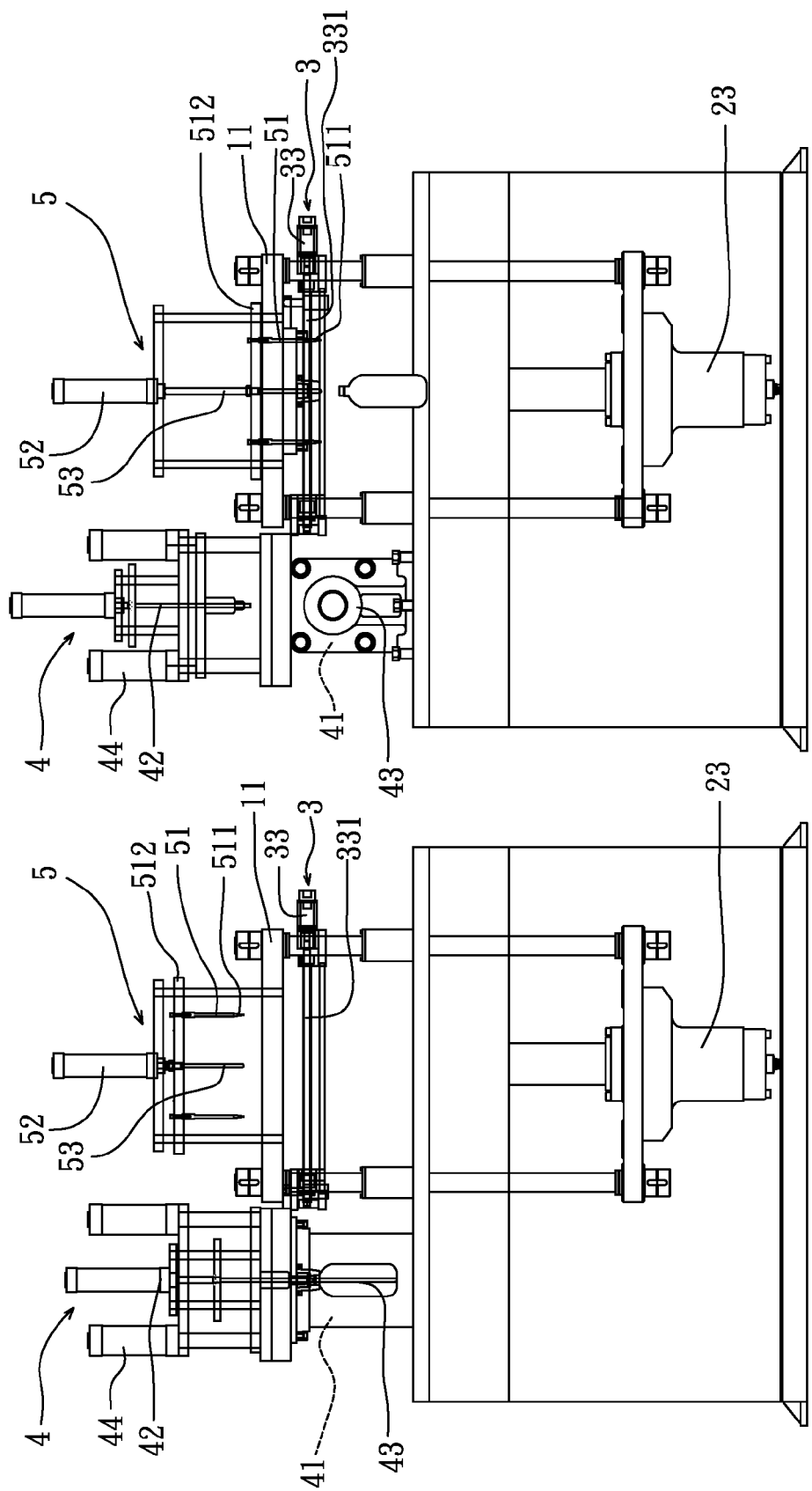

INJECTION STRETCH BLOW MOLDING SYSTEM WITH ROTATING AND LINEAR CONVEYING FUNCTIONS

BACKGROUND OF THE INVENTION

1. Field of the Invention

The present invention relates to an injection stretch blow molding system, more particularly to an injection stretch blow molding system with rotating and linear conveying functions.

2. Description of Related Art

An injection stretch blow molding art is commonly used for a hollow semi-sealed container and is processed through an injection stretch blow molding apparatus, nowadays containers for beverages, perfumes or medicines are often made by an injection stretch blow molding apparatus.

The theory of injection stretch blow molding is that a polymer material is adopted and is formed as a hollow preform with a means of injection molding through a preform mold of an injecting mechanism, then the preform is placed in a bottle blowing mold of an extending and blowing mechanism, then an bottle inflating means is processed so the heated and softened preform is expanded till right next to the inner wall of the bottle blowing mold, then the shaped bottle member is released through a pushing mechanism. So in an injection stretch blow molding operation, the thread section of the bottleneck is often served as a section to be clamped.

With the described injection stretch blow molding theory, a transversal (horizontal) blow molding apparatus with two operating positions of injecting and extending and blowing has been developed by skilled people in the art, a mobile mold sheet and a rotary mold sheet are installed in parallel with a right/left arraying means, the left end of the rotary mold sheet is connected to an axial core of a rotation seat of a supporting rack, the mobile mold sheet is provided with a core mold and an extending rod, the rotary mold sheet is provided with two identical bottleneck seat sets, a retaining mold sheet is provided with an injection mold and a bottle blowing mold, the core mold and the injection mold are correspondingly arrayed with respect to one of the two bottleneck seat sets, so a preform is able to be injected and formed, the extending rod and the bottle blowing mold are correspondingly arrayed with respect to the other bottleneck seat set so the preform is able to be extended and blown to form a bottle member, the rotary mold sheet is up/down 180-degree rotated through the rotation seat so positions of the two bottleneck seat sets are interchanged, so an automated continuous production of preform injecting and extending and blowing is achieved.

In the horizontal injection stretch blow molding apparatus with two operating positions of injecting and extending and blowing, preform injecting and extending blowing are integrated, the size of the bottle blowing mold is limited because of the size of the rotary mold sheet (rotating plate); so only a bottle member with small size can be made by the bottle blowing mold. In fact, if a large bottle member is desired to be blown, operations of opening and engaging the bottle blowing mold are performed through a gas cylinder because the space around the bottle blowing mold is limited, so a mold locking capacity may not be larger enough and an unqualified bottle member may be produced. If the size of the rotating plate is enlarged, operations of opening and engaging the bottle blowing mold can be performed by a hydraulic cylinder for blowing and forming a large-sized bottle member, but the size of the injection stretch blow molding apparatus has to be enlarged accordingly, and transportation and production cost are increased.

SUMMARY OF THE INVENTION

The applicant of the present invention has devoted himself to design and commercially distribute injection stretch blow molding apparatuses, with a hope to overcome disadvantages that the described blow molding apparatus with two or more operating positions can only produce small sized bottle members due to the limitation of the size of the rotating plate; an art has been designed by the applicant which is that after an injected preform is rotated from a first operating position to a second operating position through the lifting and rotating mechanism, the preform is then conveyed to an extending and blowing mechanism located at a third operating position through a linear convey means provided by a conveying mechanism, so that the extending and blowing mechanism is provided with a variety of modifications, after try and error the present invention "Injection Stretch Blow Molding System with Rotating and Linear Conveying Functions" is provided.

One object of the present invention is to provide an injection stretch blow molding system with rotating and linear conveying functions, in which an extending and blowing mechanism is provided at a lateral end of a lifting and rotating mechanism in a radial direction, so after a preform is rotated from a first operating position to a second operating position by the lifting and rotating mechanism, the preform is then conveyed to an extending and blowing mechanism located at a third position through a linear convey means provided by a conveying mechanism, an operation of extending and blowing is therefore able to be proceeded.

Another object of the present invention is to provide an injection stretch blow molding system with rotating and linear conveying functions with a space design of an injecting mechanism and an extending and blowing mechanism, the size of the injection stretch blow molding system is able to be reduced and space around the extending and blowing mechanism is enlarged, so an engaging driving device with a better mold locking capacity is able to be adopted for opening or engaging molds, e.g. a hydraulic cylinder, a bottle member having a larger size is able to be extended and blown, thus the extending and blowing mechanism is provided with a variety of modifications.

For achieving the above mentioned objects, one solution provided by the present invention is to provide an injection stretch blow molding system with rotating and linear conveying functions, comprises: a lifting and rotating mechanism, having a lifting seat that is able to ascend/descend on a machine body, a rotating plate is pivotally provided in the lifting seat, two bottleneck seats are oppositely and radially provided on the bottom surface of the rotating plate, each of the bottleneck seats has at least one bottleneck mold, with the rotation of the rotating plate, positions of the two bottleneck seats are able to be interchanged between a first and a second operating positions; an injecting mechanism installed at the first operating position, the injecting mechanism has a female mold installed below the rotating plate and at least one core mold installed on the lifting seat and able to be longitudinally moved, the core mold is able to pass through the rotating plate and the bottleneck mold of the bottleneck seat and enter the female mold, so a preform injecting operation is able to be proceeded; a conveying mechanism installed at the second operating position, the conveying mechanism has a conveying seat that is served to connect to one of the bottleneck seats rotated from the first operating position to the second operating position, each of the bottleneck molds clamps a preform, the conveying seat is driven by a convey driving device, so the conveying seat and the bottleneck seat connected to the conveying seat are moved towards an extending and blowing mechanism; an extending and blowing mechanism installed at a third operating position, the extending and blowing mechanism has a bottle blowing mold controlled by an engaging driving device to open/engage molds, the preform is received in the bottle blowing mold and the top end thereof is provided adjacent to the bottleneck seat, an extending rod capable of lifting is installed on top of the bottle blowing mold and passes through the bottleneck mold of the bottleneck seat and enter the preform so an inflating operation is able to be processed; and a pushing mechanism installed at the second operating position, having a releasing device capable of lifting; after a bottle member being extended and blown is conveyed from the third operating position to the second operating position through the conveying mechanism, the releasing device is descended so that an mold opening operation is processed on the bottleneck seat and the bottle member is released from the bottleneck seat.

BRIEF DESCRIPTION OF THE DRAWINGS

FIG. 7 to FIG. 10 are flowcharts of operations of conveying, extending and blowing, and pushing of the injection stretch blow molding system of the present invention;

DETAILED DESCRIPTION OF THE PREFERRED EMBODIMENT

Figure 1:
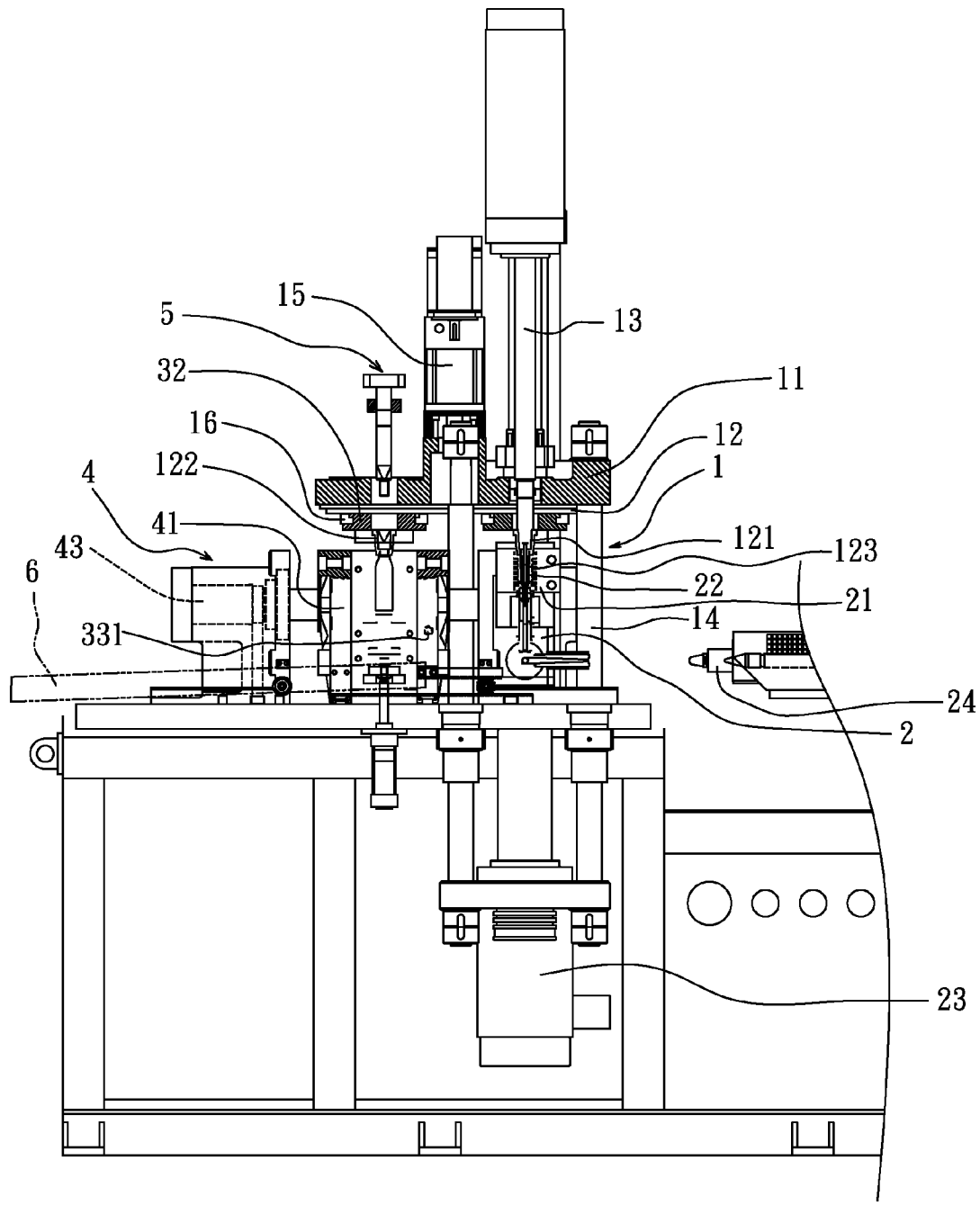
FIG. 1 is a front view of the injection stretch blow molding system with rotating and linear conveying functions provided by the present invention.
Figure 2:
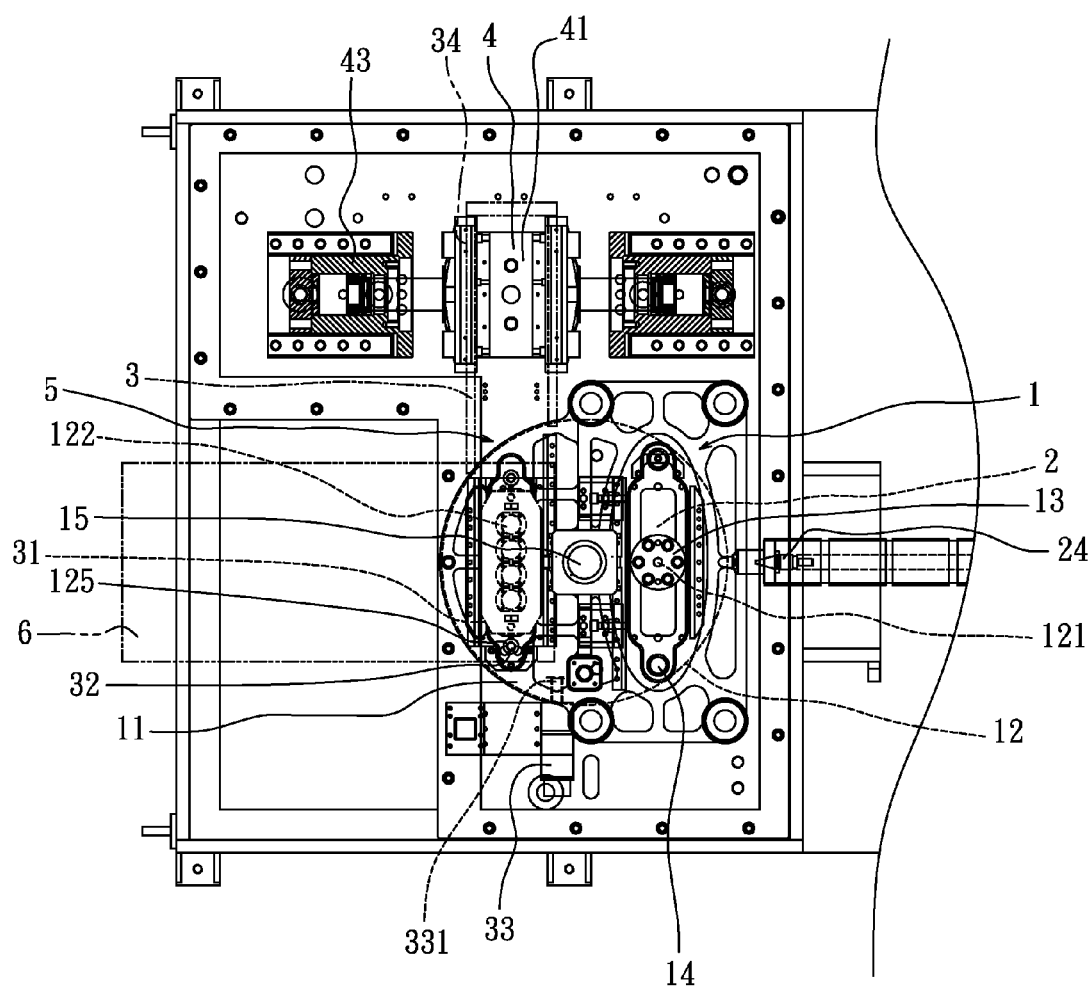
FIG. 2 is a top view of the injection stretch blow molding system of the present invention.

As shown from FIG. 1 to FIG. 4, the injection stretch blow molding system with rotating and linear conveying functions provided by the present invention is composed by a lifting and rotating mechanism 1, an injecting mechanism 2, a conveying mechanism 3, an extending and blowing mechanism 4 and a pushing mechanism 5.

In the lifting and rotating mechanism 1, a rotating plate 12 is pivotally installed in a lifting seat 11, the lifting seat 11 is driven by a lifting driving device 13, e.g. a hydraulic cylinder or a gas cylinder, and the listing seat 11 is installed on plural supporting racks 14 provided in a machine body and is able to be longitudinally moved thereon, and the rotating plate 12 is synchronously driven to longitudinally moved. A transmission device 15, e.g. a servo motor, is installed on a top end of the rotating plate 12 so positions of a first and a second bottleneck seats 121, 122 oppositely and radially provided on a bottom surface of the rotating plate 12 are able to be interchanged with an angle of 180 degree, in other words a first operating position and a second operating position are interchanged. The first and the second bottleneck seats 121, 122 are provided with one or more bottleneck molds 123, and the first and the second bottleneck seats 121, 122 are respectively defined as a half of a mold, in other words the first and the second bottleneck seats 121, 122 are respectively composed by a half mold, and a resilient device, e.g. a tightening spring, is served to tighten the two half molds when the two half molds are engaged, two ends of each of the first and the second bottleneck seats 121, 122 respectively have an inwardly-beveled surface, so an inwardly-beveled concave section is defined when the first and the second bottleneck seats 121, 122 are engaged.

As shown from FIG. 2 to FIG. 6, two lateral ends of each of the two bottleneck seats 121, 122 are respectively provided in a pair of retaining sliding rails 16. For preventing the bottleneck seats, 121, 122 from being released from the corresponding pair of retaining sliding rails 16 due to a centrifugal force, a latching device 17 is therefore provided at an outer end of one of each pair of retaining sliding rails 16, a buckling tenon 171 provided one end of the latching device 17 passes through the retaining sliding rail 16 and is buckled in a buckling slot 124 preset on the bottleneck seat 121 or 122, so each of the bottleneck seats 121, 122 are individually positioned and retained.

Figure 3:
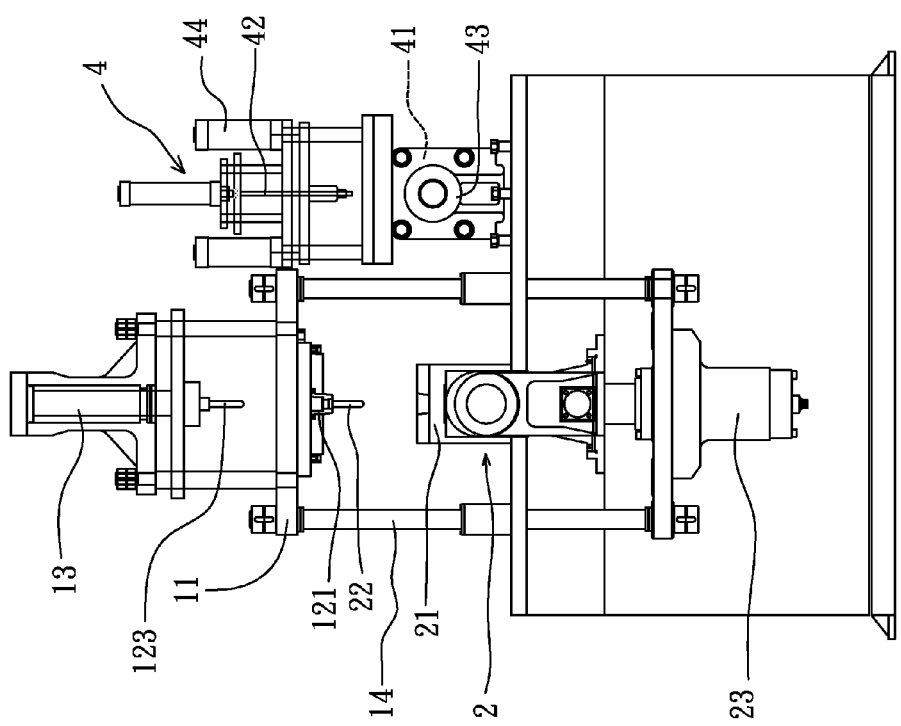
FIG. 3 is a right side view of the injection stretch blow molding system of the present invention.

The injecting mechanism 2 is composed by a female mold 21 and a core mold 22, the female mold 21 is fastened on the machine body and is disposed below the rotating plate 12 of the lifting and rotating mechanism 1, and the core mold 22 is provided on top of the lifting seat 11, so that after the core mold 22 passes through the rotating plate 12 downwardly driven by the lifting seat 11 and passes through a bottleneck mold 123 provided on the first bottleneck seat 121 or the second bottleneck seat 122, the core mold 22 enters the female mold 21 for forming a mold engaging status. At this moment, a melted plastic material is injected into the female mold 21 through an injecting pipe 24 of an injecting machine so as to obtain a preform; after an operation of mold opening is processed, in other words the core mold 22 and the rotating plate 12 of the lifting seat 11 are lifted and the preform is released from the female mold 21 and is clamped by the bottleneck mold 123 of the first bottleneck seat 121 (as shown in FIG. 3), thus the preform is at the first operating position where the injecting mechanism 2 is provided.

Figure 6:
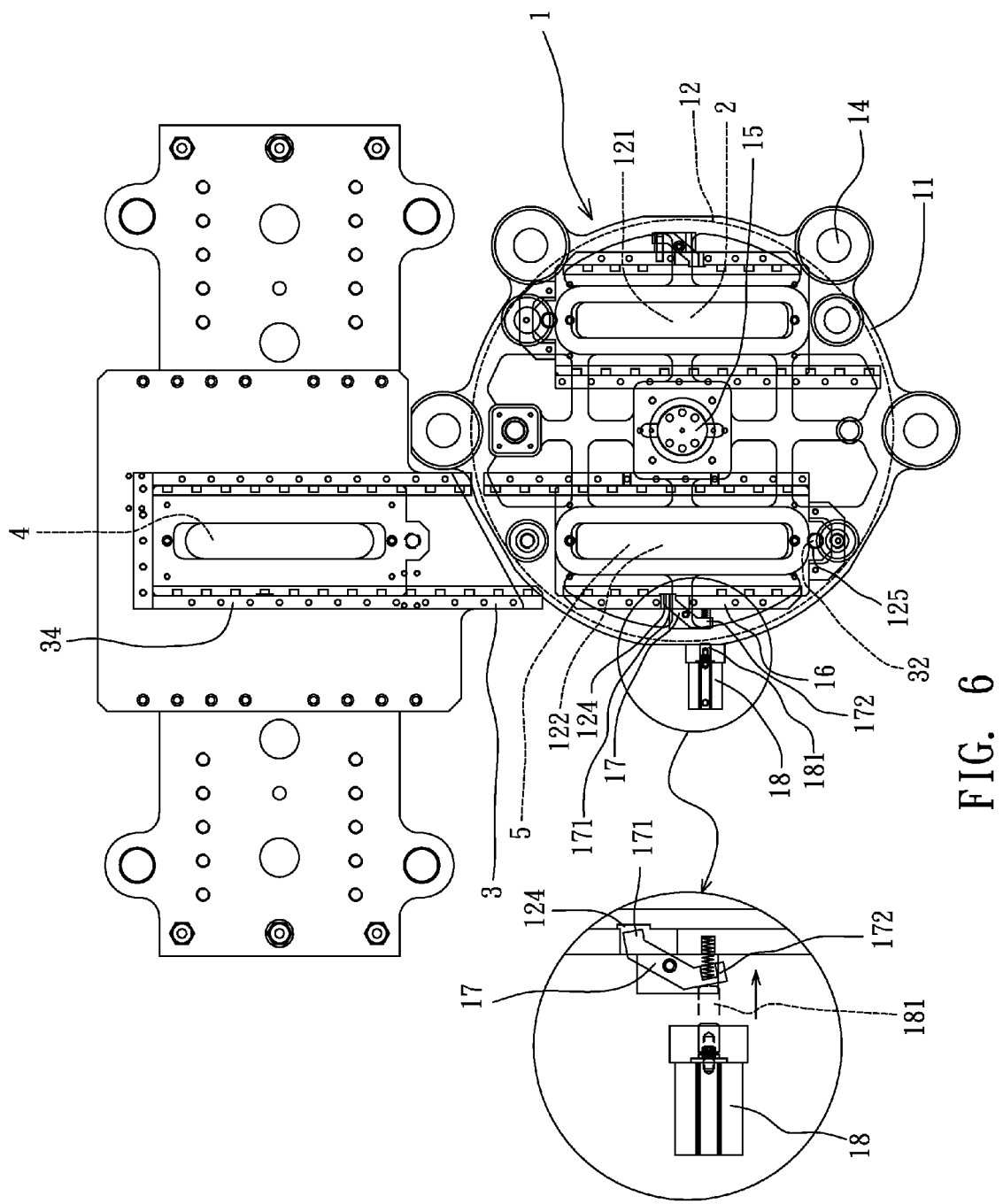
FIG. 6 is a schematic view of the lifting and rotating mechanism and the extending and blowing mechanism of the present invention.

As shown in FIG. 6 and FIG. 7, when the first bottleneck seat 121 and the preform clamped by the bottleneck mold 123 thereof are rotated to the conveying mechanism 3 through the rotating plate 12, the lifting seat 11 drives the rotating plate 12 to descend, and a retractable rod 181 of a releasing device 18, e.g. a hydraulic cylinder, protrudes and pushes a resilient section 172 provided on the other end of the latching device 17 so the buckling tenon 171 is inwardly retracted and the first bottleneck seat 121 is released from a latching status, so the first bottleneck seat 121 and the preform clamped by the bottleneck mold 123 thereof are able to be conveyed to a third operating position through the conveying mechanism 3, as shown in FIG. 8, the position is where the extending and blowing mechanism 4 is placed.

Referring from FIG. 4 to FIG. 6, through the conveying mechanism 3, the first bottleneck seat 121 provided below the rotating plate 12 is rotated from the first operating position to the second operating position, and the second bottleneck seat 122 is rotated from the second operating position to the first operating position, the two bottleneck seats 121, 122 are descended with the decent movement of the rotating plate 12 so the second bottleneck seat 122 is disposed on top of the female mold 21, meanwhile the core mold 22 is descended and provided in the female mold 21 so as to form a mold engaging status, an injecting operation of preform is therefore able to be processed. A connection is formed between a connecting pin 32 protrudingly provided on a conveying seat 31 and a pin hole 125 provided at an end section of the first bottleneck seat 121; and through operations of a convey driving device 33, e.g. a servo motor, the conveying seat 31 pivotally connected to plural screw rods 331 is driven to move towards the extending and blowing mechanism 4 located at the third operating position. A pair of extending sliding rails 34 are installed on top of a bottle blowing mold 41 of the extending and blowing mechanism 4, the pair of extending sliding rails 34 is provided adjacent to one of the pairs of retaining sliding rails 16 of the rotating plate 12, so with transversal movements of the conveying seat 31 and the connecting pin 32, the first bottleneck seat 121 is able to be moved to the extending and blowing mechanism 4 located at the third operating position along the pair of extending sliding rails 34.

Reciprocal-type members of the conveying mechanism 3 are not limited to the described convey driving device 33 and the screw rods 331, the reciprocal-type members can also be conventional retracting driving devices, e.g. gas cylinders or hydraulic cylinders, so that a linear conveying function is obtained.

Referring to FIG. 1 to FIG. 4, the extending and blowing mechanism 4 is composed by the bottle blowing mold 41 and the extending rod 42 extending from the top end of the bottle blowing mold 41; after the first bottleneck seat 121 and the preform clamped by the bottleneck mold 123 thereof that are conveyed by the conveying mechanism 3 enter the bottle blowing mold 41 which is in an open status, engaging driving devices 43, e.g. hydraulic cylinders, provided at two ends are processed with an engaging operation, meanwhile the extending rod 42 is descended with an operation of a retracting driving device 44, e.g. a hydraulic cylinder, and the extending rod 42 passes through and seal the bottleneck mold 123 of the first bottleneck seat 121 and enters the preform, so an inflating operation is able to be proceeded, thus the preform is expanded till right next to the inner wall of the bottle blowing mold 41, so a bottle member shown in FIG. 9 is obtained.

After the bottle member is cooled and solidified, the extending rod 42 is retracted and the bottle blowing mold 41 is opened by the engaging driving devices 43, the first bottleneck seat 121 and the bottle member clamped by the bottleneck mold 123 are conveyed to the second operating position through the conveying mechanism 3, so the buckling tenon 171 of the latching device 17 is automatically buckled in the buckling slot 124 of the first bottleneck seat 121, a positioning status is therefore obtained.

Figure 4:
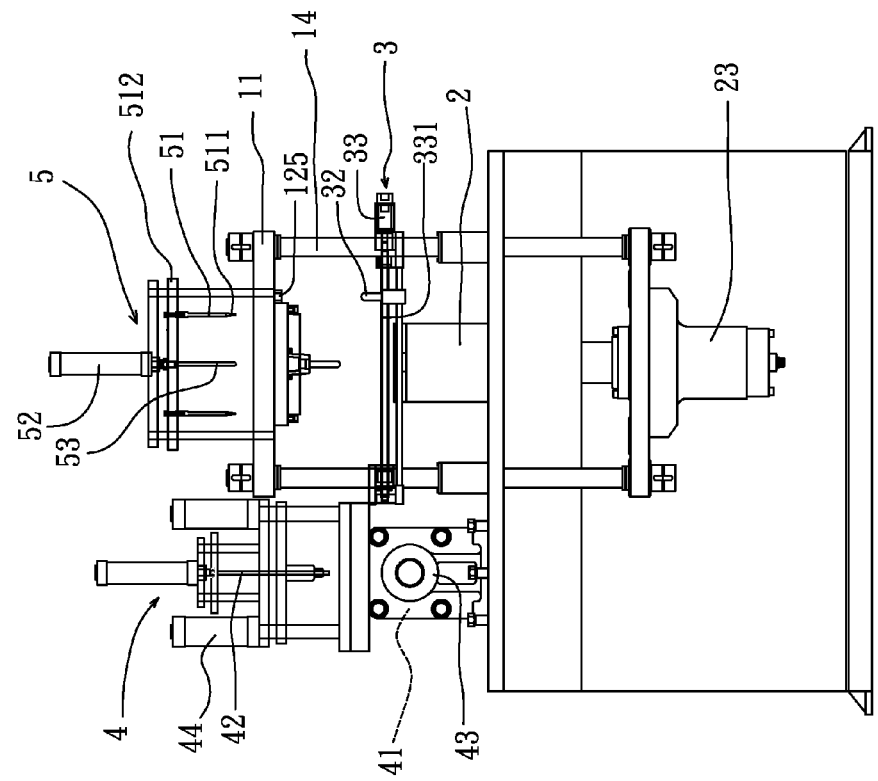
FIG. 4 is a left side view of the injection stretch blow molding system of the present invention.
Figure 5:
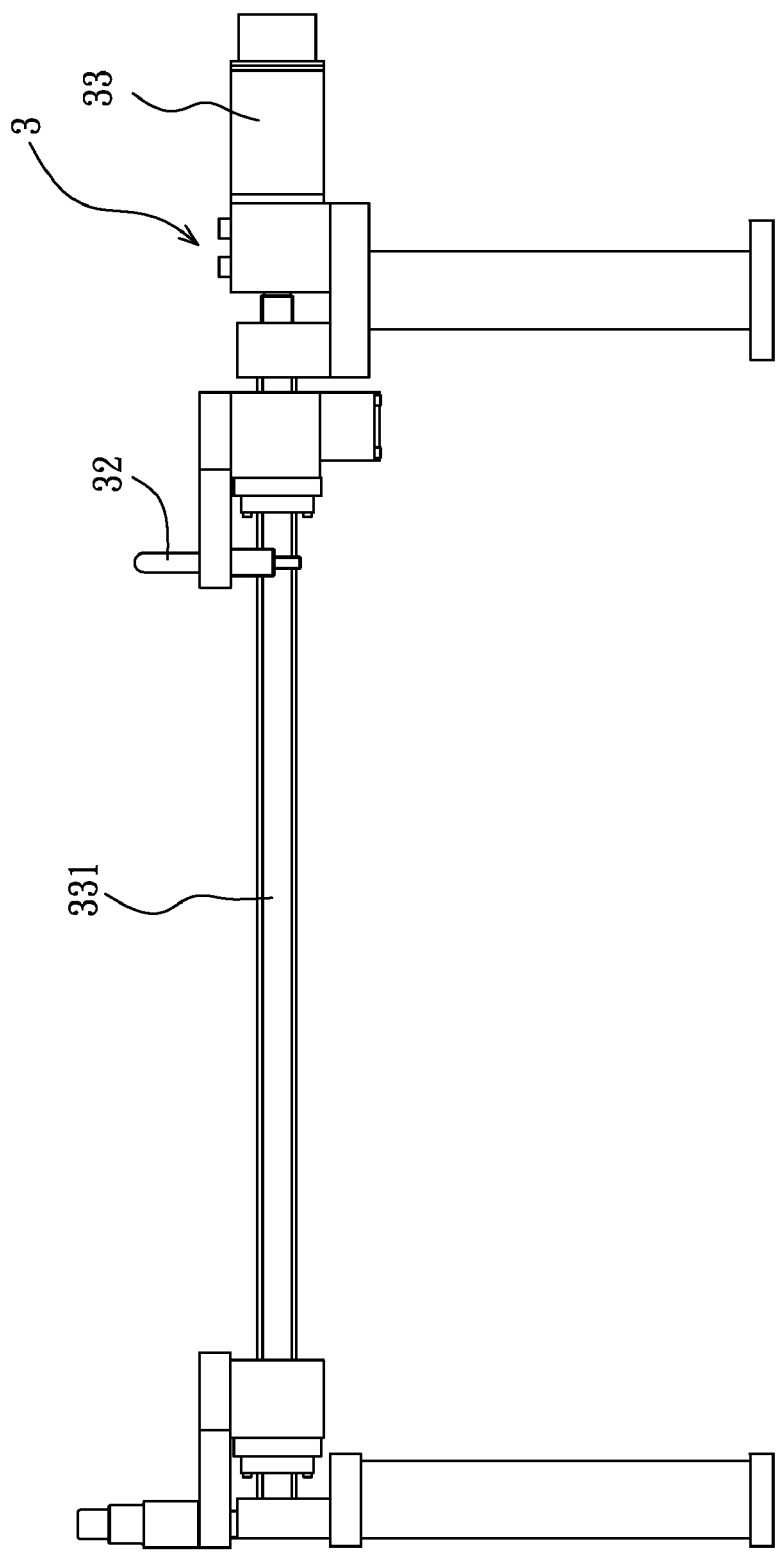
FIG. 5 is a schematic view of the conveying mechanism of the present invention.

Referring to FIG. 4 and FIG. 10, the pushing mechanism 5 has a bottle releasing device 51 which is a pushing blades 511 having a beveled-craft thickness and being formed as in a flat sharp shape, e.g. screw knifes, and are provided at two ends of a connecting rod 512 driven by a retracting driving device 52 for performing an ascent/descent movement. When the bottle member after being extended and blown is conveyed from the third operating position back to the second operating position through the conveying mechanism 3, the pair of pushing blades 511 reach the concave surfaces formed on the two beveled surfaces provided at the two lateral ends of the first bottleneck seat 121 and the bottleneck mold 23 is outwardly expanded, a pushing rod 53 provided on the connecting rod 512 enters the bottleneck mold 123 of the first bottleneck seat 121, so the bottleneck of the bottle member is extruded and the bottle member after being expanded and blown is facilitated to fall, then the pair of pushing blades 511 retract to original positions with the connecting rod 512, the fallen bottle member is then conveyed by a convey belt 6 to the exterior of the machine body. At this moment, the rotating plate 12 is driven to ascend by the lifting seat 11, and another injection-formed preform clamped by the bottleneck mold 123 of the second bottleneck seat 122 is also ascended, therefore the described operations of rotating, conveying, extending and blowing, and pushing are able to be repeatedly proceeded. By reciprocally performing the described operations, an automated continuous production of preform injecting and expanding and blowing can be achieved.

In the above mentioned embodiment, when being conveyed from the second operating position to the third operating position, the rotating plate 12 has to descend with the descent movement of the lifting seat 11, so that the pin hole 125 of the first or the second bottleneck seat 121 or 122 serving to clamp the preform is able to be connected to the connecting pin 32 of the conveying seat 31, so the bottleneck seat 121 or 122 can be conveyed; during this procedure, the bottle blowing mold 41 is in an open status and an engaging operation thereof may consume 1 to 2 seconds, such consumed time may be considered as a negative factor for an automated continuous production.

Referring from FIG. 11 to FIG. 14, which illustrate another embodiment of the present invention, an extending sheet 111 is integratedly provided to the lifting seat 11 towards the direction of the extending and blowing mechanism 4 located at the third operating position, the top surface thereof is served to install the extending and blowing mechanism 4, the bottom surface thereof is provided with a pair of extending sliding rails 34 that is adjacent to one of the pairs of retaining sliding rails 16 of the rotating plate 12, so the first or the second bottleneck seats 121, 122 can be conveyed by the conveying mechanism 3 installed at the outer end of the second operating position through the lifting seat 11.

Figure 11:
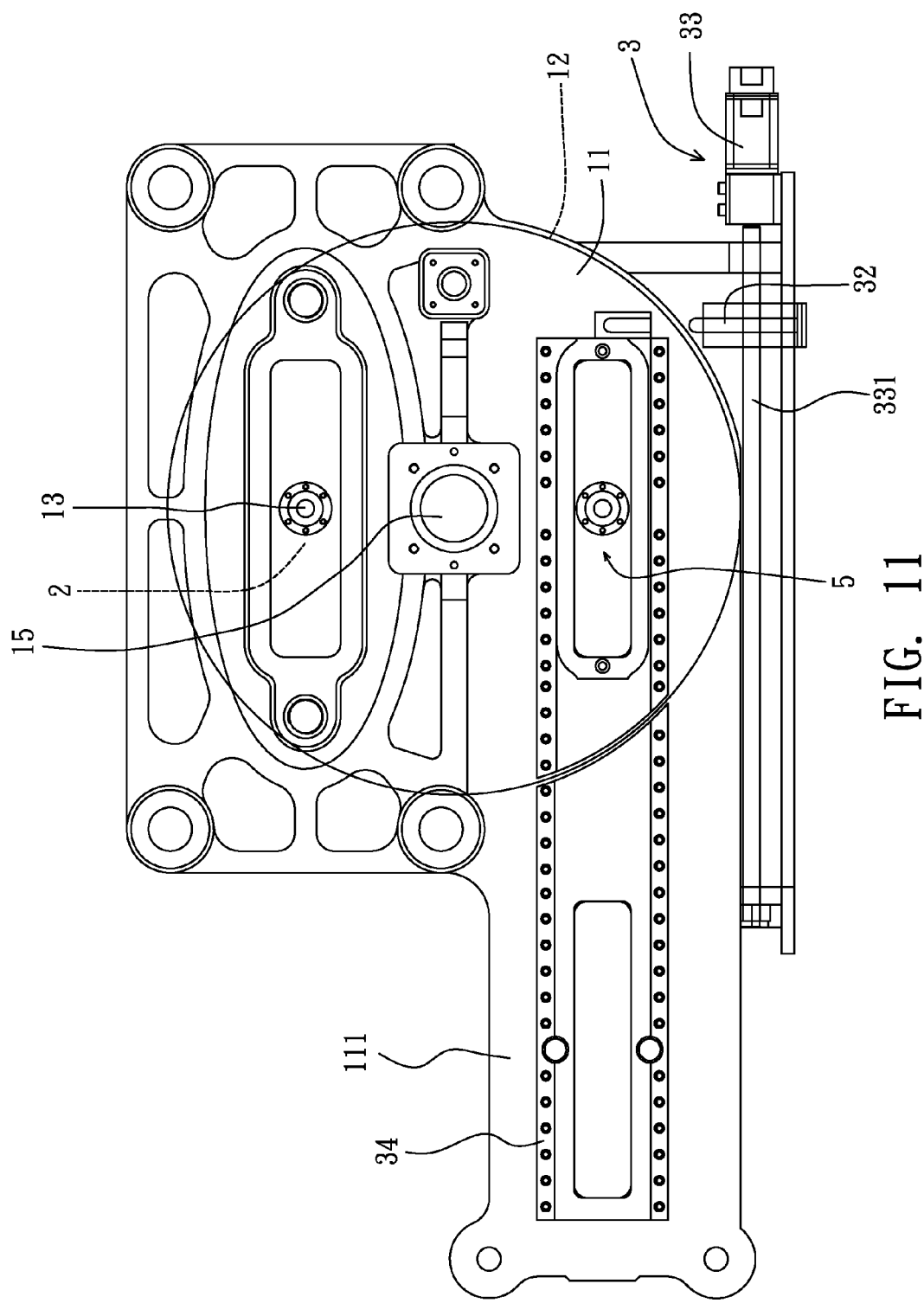
FIG. 11 and FIG. 12 are schematic views of the lifting and rotating mechanism and the conveying mechanism of another embodiment of the present invention.
Figure 12:
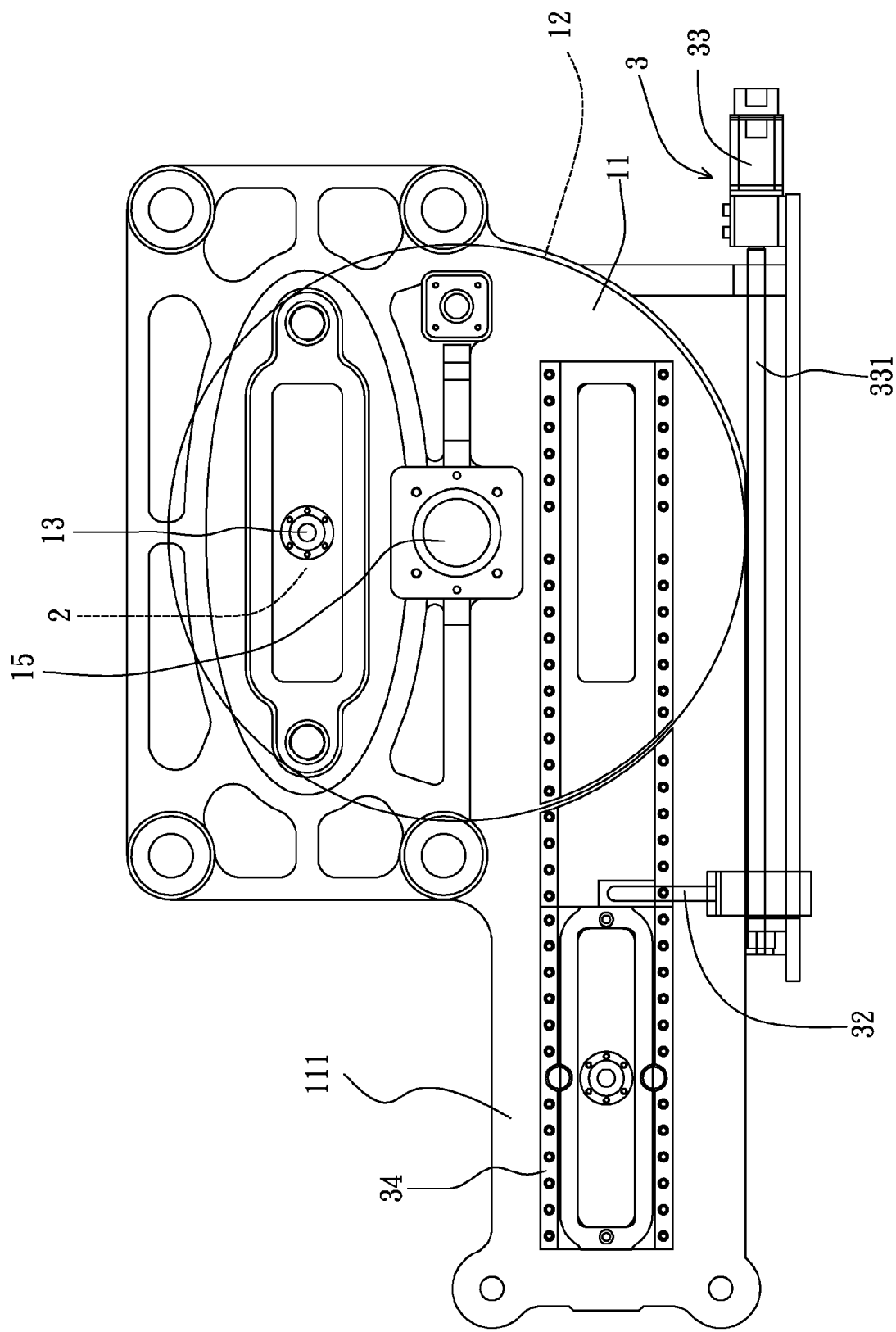

Referring to FIG. 11 and FIG. 12, a connecting pin 32, e.g. an air cylinder, is provided on a conveying seat 31 of the conveying mechanism 3, when a preform is clamped by either of the bottleneck seats 121, 122 that is in an ascent status and is rotated from the first operating position to the second operating position, the connecting pin 32 immediately protrudes and inserts into the pin hole 125 of the bottleneck seat so as to form a connection. At the meanwhile, the conveying seat 31 pivotally connected to at least one screw rod 331 is moved towards the extending and blowing mechanism 4 located at the third operating position.

Figure 14:
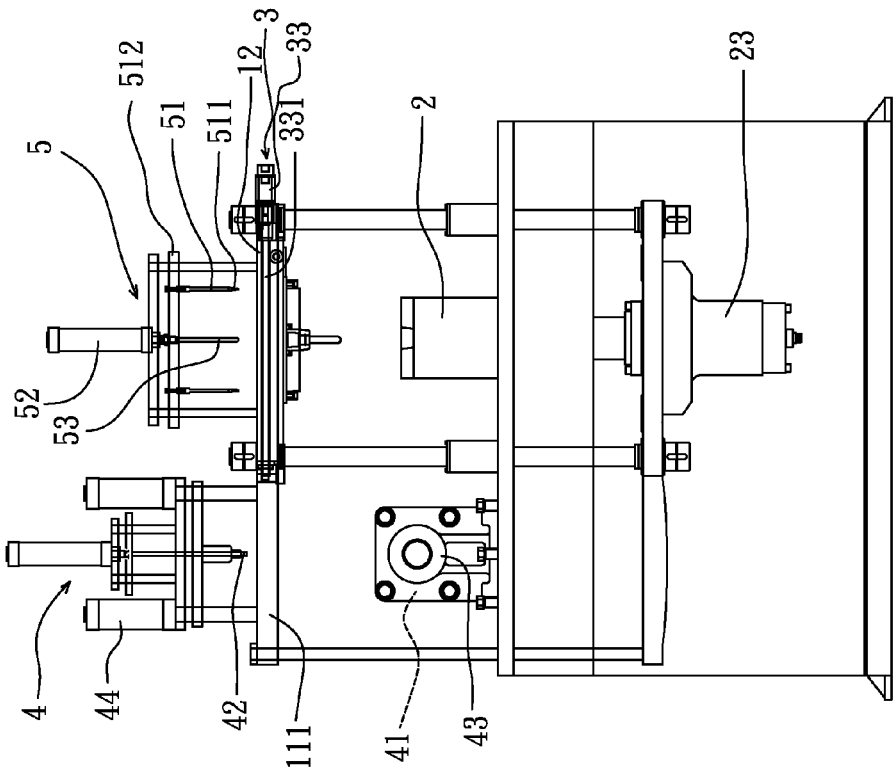
FIG. 13 and FIG. 14 are a right side view and a left side view of the lifting and rotating mechanism and the conveying mechanism of another embodiment of the present invention.
Figure 13:
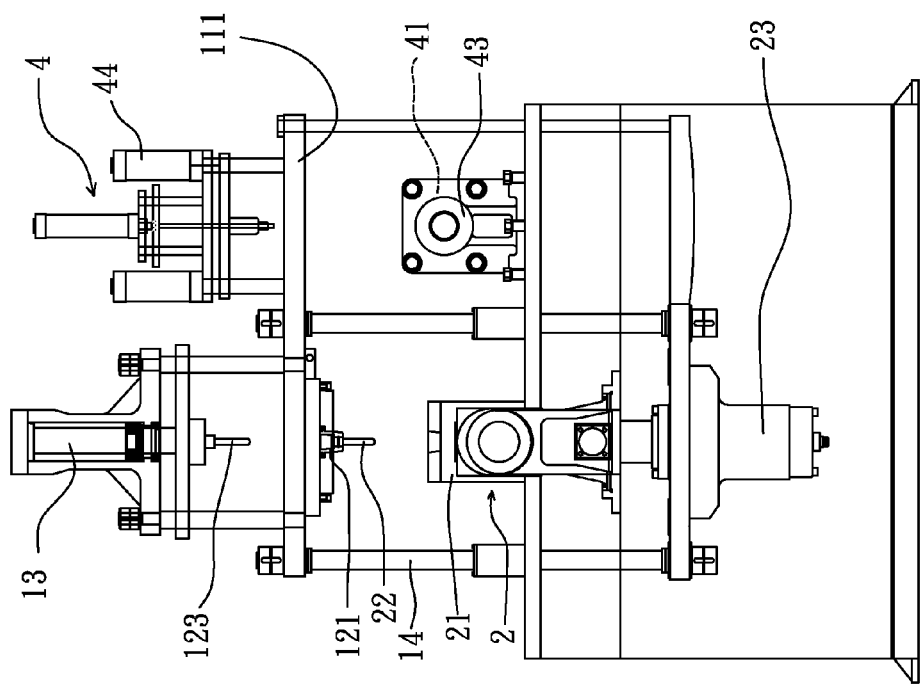

Referring to FIG. 13 and FIG. 14, when the bottleneck seat, e.g. the first bottleneck seat 121, and the preform are conveyed to the extending and blowing mechanism 4 through the conveying mechanism 3, the lifting seat 11 is descended so the first bottleneck seat 121 is provided on the bottle blowing mold 41 and the preform is directly inserted into the bottle blowing mold 41 which is in an engaging status; the second bottleneck seat 122 is provided on the female mold 21 and the core mold 22 passes through the second bottleneck seat 122 and the bottleneck mold 123 and is inserted into the female mold 21, so operations of extending and blowing and injecting can be respectively processed; so the engaging time of the bottle blowing mold 41 can be reduced and the production capacity is increased.

The advantages of the present invention are: the extending and blowing mechanism is provided at a lateral end of the lifting and rotating mechanism in a radial direction, so after the preform is rotated from the first operating position to the second operating position through the lifting and rotating mechanism, the preform is conveyed to the extending and blowing mechanism located at the third operating position through a linear convey of the conveying mechanism; because space around the extending and blowing mechanism is enlarged, engaging driving devices with better mold-locking capacities are able to be adopted, e.g. hydraulic cylinders, so a bottle member with a larger size is able to be extended and blown; compared with a conventional injection stretch blow molding system with two or more operating positions, for blowing a bottle member with the same volume, because the present invention has overcome limitations of sizes of the rotating plate and the bottle blowing mold, so the size of the injection stretch blow molding system of the present invention can be reduced; and because the space around the extending and blowing mechanism is enlarged, a variety of modifications can be made.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An injection stretch blow molding system with rotating and linear conveying functions, comprising:
   a lifting and rotating mechanism having a lifting seat able to ascend/descend on a machine body, a rotating plate is pivotally provided in the lifting seat, two bottleneck seats are oppositely and radially provided on the bottom surface of the rotating plate, each of the bottleneck seats has at least one bottleneck mold, with the rotation of the rotating plate, positions of the two bottleneck seats are able to be interchanged between a first and a second operating positions;
   an injecting mechanism installed at the first operating position and having a female mold installed below the rotating plate and at least one core mold installed on the lifting seat and able to be longitudinally moved, the core mold is able to pass through the rotating plate and the bottleneck mold of the bottleneck seat and enter the female mold, so a preform injecting operation is able to be proceeded;
   a conveying mechanism installed at the second operating position and having a conveying seat served to connect to the bottleneck seat rotated from the first operating position to the second operating position, each of the bottleneck molds clamps a preform, the conveying seat is driven by a convey driving device, so the conveying seat and the bottleneck seat connected to the conveying seat are moved towards an extending and blowing mechanism;
   an extending and blowing mechanism installed at a third operating position and having a bottle blowing mold controlled by an engaging driving device to open/engage molds, the preform is received in the bottle blowing mold and the top end thereof is provided adjacent to the bottleneck seat, an extending rod capable of lifting is installed on top of the bottle blowing mold and passes through the bottleneck mold of the bottleneck seat and enters the preform so an inflating operation is able to be processed; and
   a pushing mechanism installed at the second operating position and having a releasing device capable of lifting; after a bottle member being extended and blown is conveyed from the third operating position to the second operating position through the conveying mechanism, the releasing device is descended so that an mold opening operation is processed on the bottleneck seat and the bottle member is released from the bottleneck seat.

2. The injection stretch blow molding system with rotating and linear conveying functions as claimed in claim 1, wherein two lateral ends of each of the two bottleneck seats are respectively installed in a pair of retaining sliding rails provided at the bottom surface of the rotating plate; a pair of extending sliding rails is installed on top of the bottle blowing mold of the extending and blowing mechanism, the pair of extending sliding rails is provided adjacent to one of the two pairs of retaining sliding rails, so the bottleneck seat is able to be reciprocally moved between the second and the third operating positions.

3. The injection stretch blow molding system with rotating and linear conveying functions as claimed in claim 1, wherein two lateral ends of each of the two bottleneck seats are respectively installed in a pair of retaining sliding rails provided at the bottom surface of the rotating plate; an extending sheet is integrately provided to the lifting seat in a direction towards the extending and blowing mechanism located at the third operating position, the top surface thereof is served to install the extending and blowing mechanism, the bottom surface thereof is provided with a pair of extending sliding rails adjacent to one of the two pair of retaining sliding rails provided on the rotating plate, so the bottleneck seat is able to be reciprocally moved between the second and the third operating positions.

4. The injection stretch blow molding system with rotating and linear conveying functions as claimed in claim 2, wherein a latching device is provide at an outer side of the retaining sliding rail, a buckling tenon provided at one end of the latching device passes through the retaining sliding rail and is buckled in a buckling slot provided at each of the bottleneck seats; when a bottleneck seat is rotated from the first operating position to the second operating position, an extending rod of a releasing device provided at an lateral end of the lifting seat protrudes and pushes a resilient section provided at the other end of the latching device, so the buckling tenon is inwardly extracted and the bottleneck seat is released from a latching status.

5. The injection stretch blow molding system with rotating and linear conveying functions as claimed in claim 3, wherein a latching device is provide at an outer side of the retaining sliding rail, a buckling tenon provided at one end of the latching device passes through the retaining sliding rail and is buckled in a buckling slot provided at each of the bottleneck seats; when a bottleneck seat is rotated from the first operating position to the second operating position, an extending rod of a releasing device provided at an lateral end of the lifting seat protrudes and pushes a resilient section provided at the other end of the latching device, so the buckling tenon is inwardly extracted and the bottleneck seat is released from a latching status.

6. The injection stretch blow molding system with rotating and linear conveying functions as claimed in claim 1, wherein a connecting pin is protrudingly provided to the conveying seat and is connected to a pin hole at an end section of the bottleneck seat, so the bottleneck seat is synchronously driven to move.

7. The injection stretch blow molding system with rotating and linear conveying functions as claimed in claim 1, wherein the convey driving device is a servo motor connected to at least one screw rod and served to pivotally connect to the conveying seat.

8. The injection stretch blow molding system with rotating and linear conveying functions as claimed in claim 1, wherein the convey driving device is a gas cylinder or a hydraulic cylinder.

9. The injection stretch blow molding system with rotating and linear conveying functions as claimed in claim 1, wherein the engaging driving device is a hydraulic cylinder.

10. The injection stretch blow molding system with rotating and linear conveying functions as claimed in claim 1, wherein the bottle releasing device is a pushing blade having a beveled-craft thickness and being formed as in a flat sharp shape and are provided at two ends of a connecting rod driven by a retracting driving device for performing an ascent/descent movement.

11. The injection stretch blow molding system with rotating and linear conveying functions as claimed in claim 10, wherein the connecting rod is installed with at least one pushing rod that passes through the bottleneck mold of each of the bottleneck seat so as to push out the bottle member.

* * * * *